J. H. ENGLEMAN.
MACHINE FOR MANUFACTURING LACQUERED WARE.
APPLICATION FILED NOV. 29, 1910.
990,645.
Patented Apr. 25, 1911.
5 SHEETS—SHEET 2.
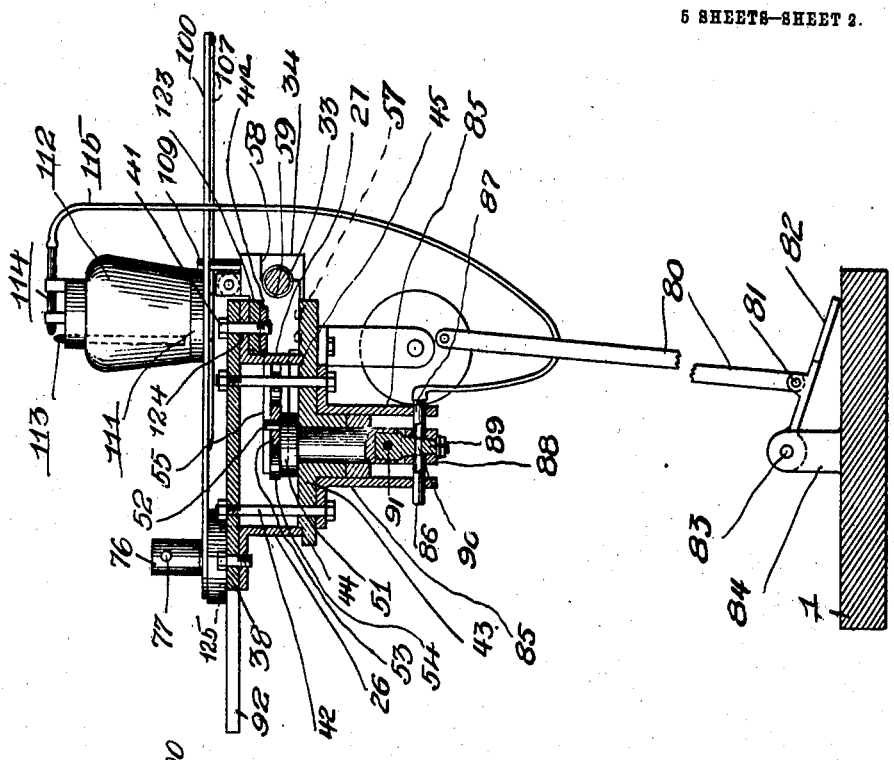
WITNESSES
INVENTOR
J. H. ENGLEMAN
Attorneys.

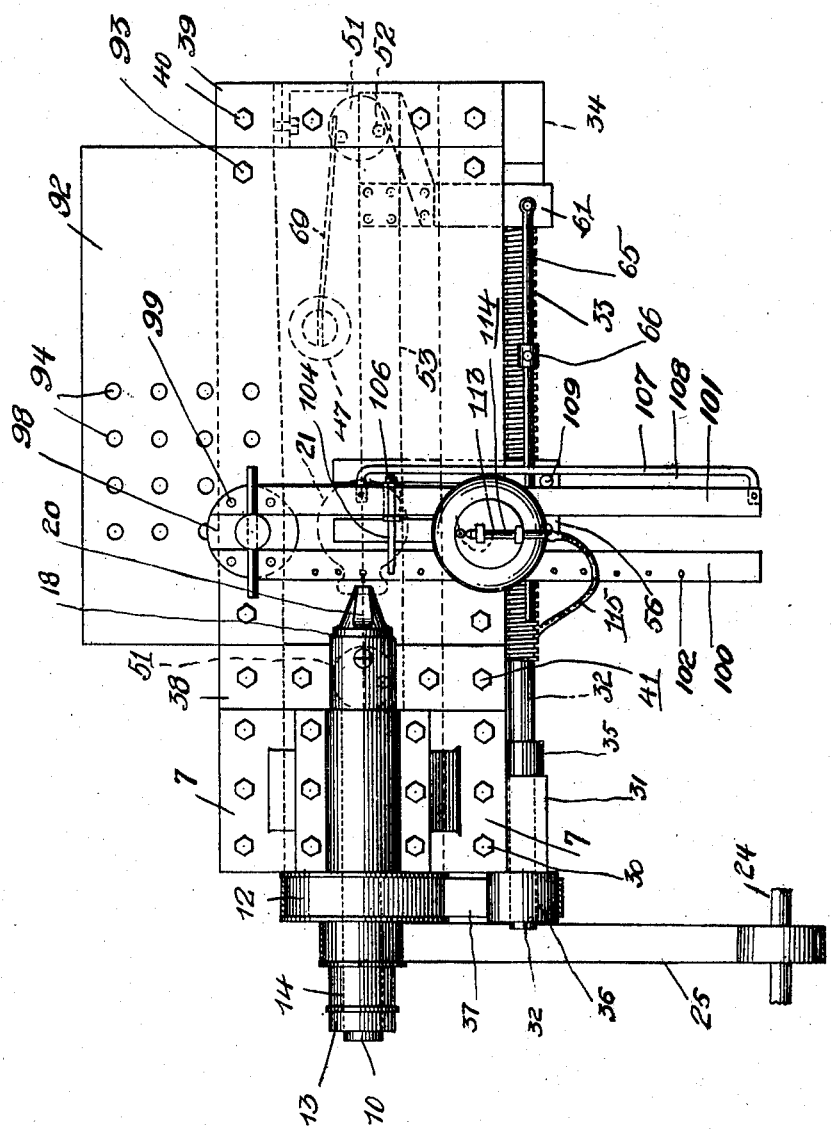

J. H. ENGLEMAN.
MACHINE FOR MANUFACTURING LACQUERED WARE.
APPLICATION FILED NOV. 29, 1910.
990,645.
Patented Apr. 25, 1911.
5 SHEETS—SHEET 3.
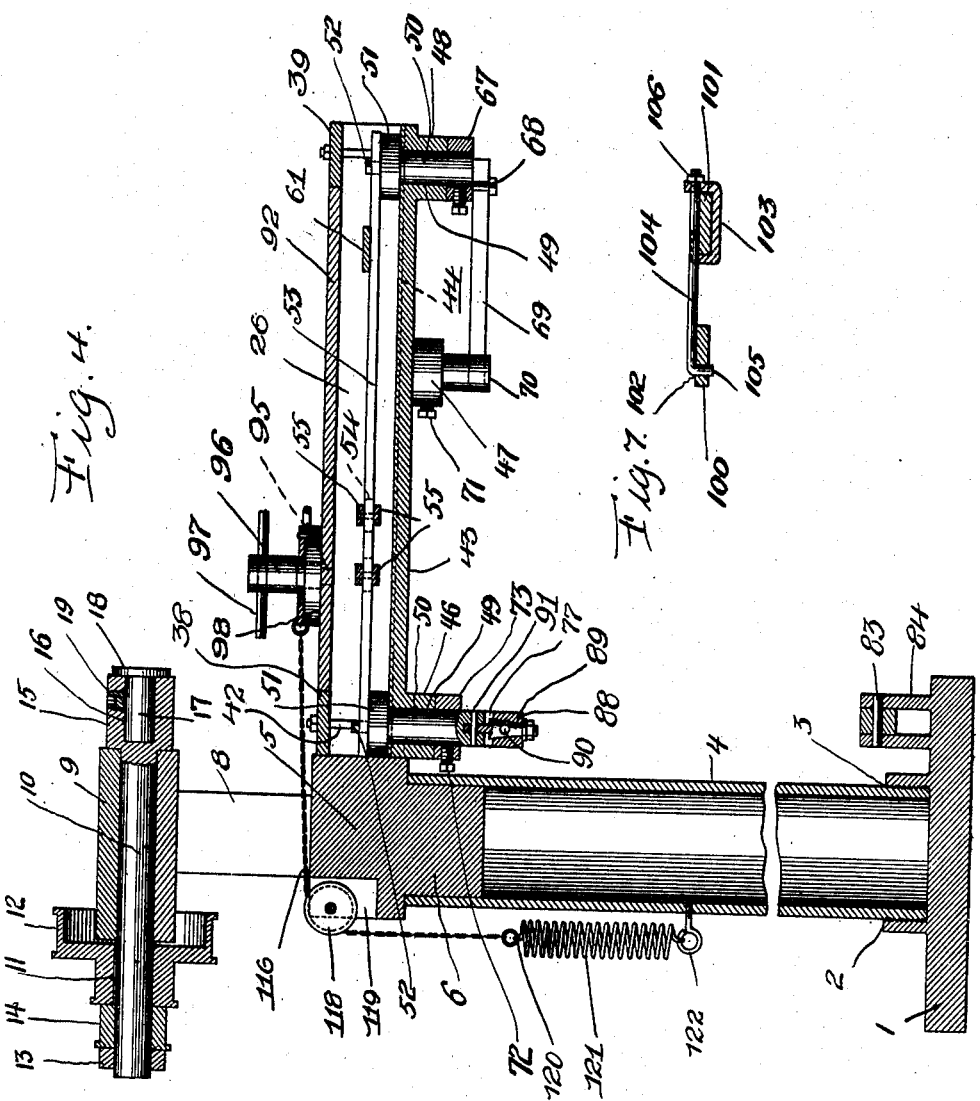
WITNESSES
INVENTOR
J. H. Engleman,
by
Attorneys.

J. H. ENGLEMAN.
MACHINE FOR MANUFACTURING LACQUERED WARE.
APPLICATION FILED NOV. 29, 1910.
990,645.
Patented Apr. 25, 1911.
5 SHEETS—SHEET 4.
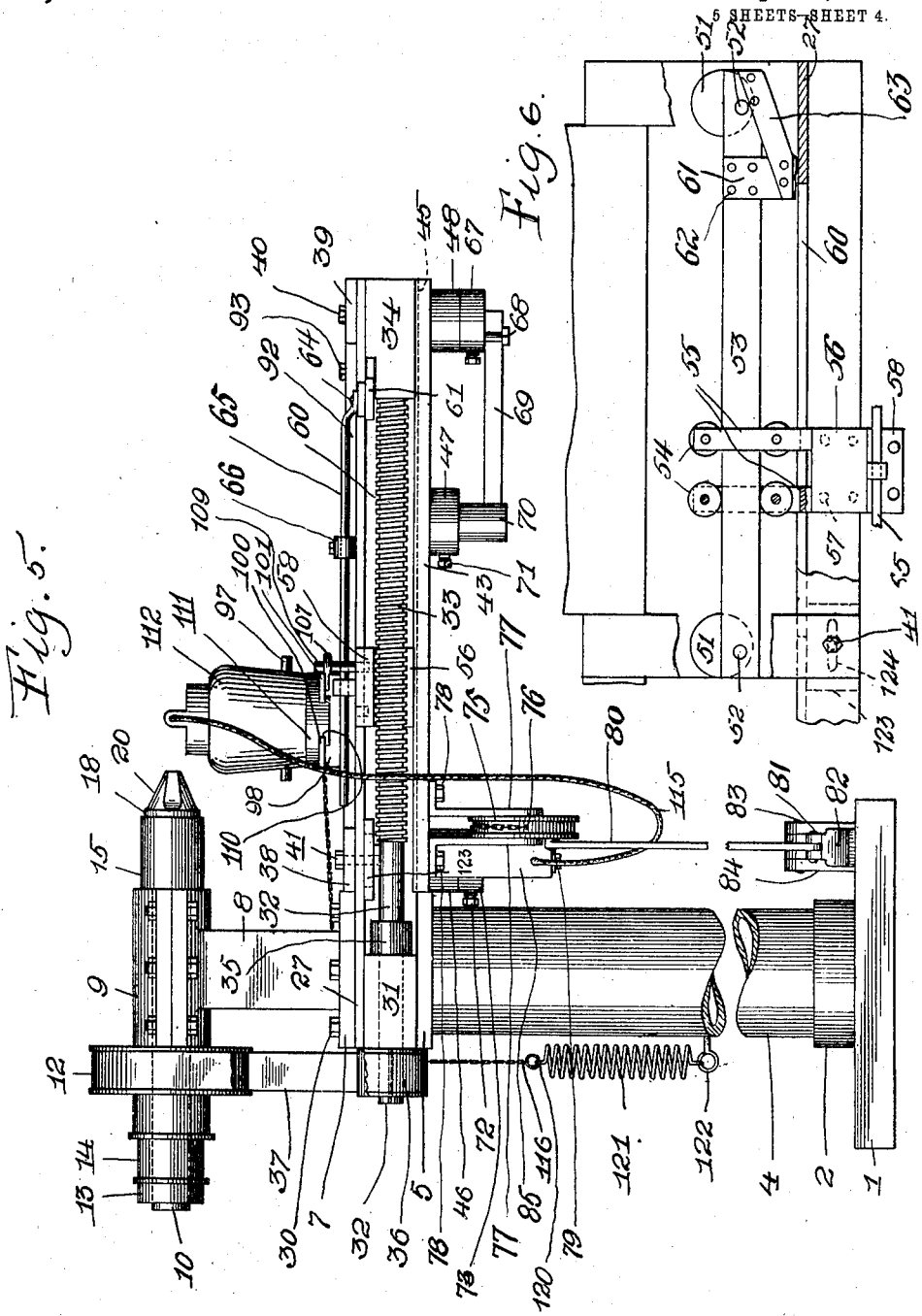

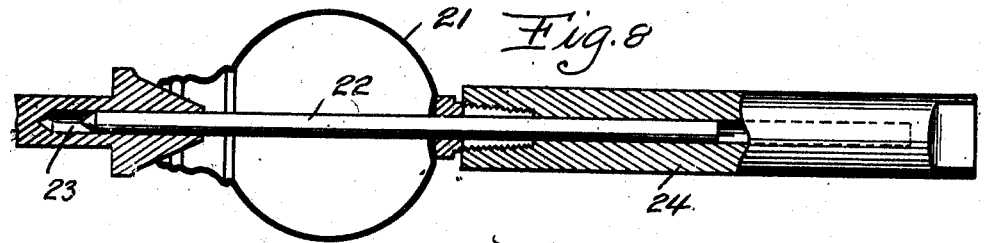
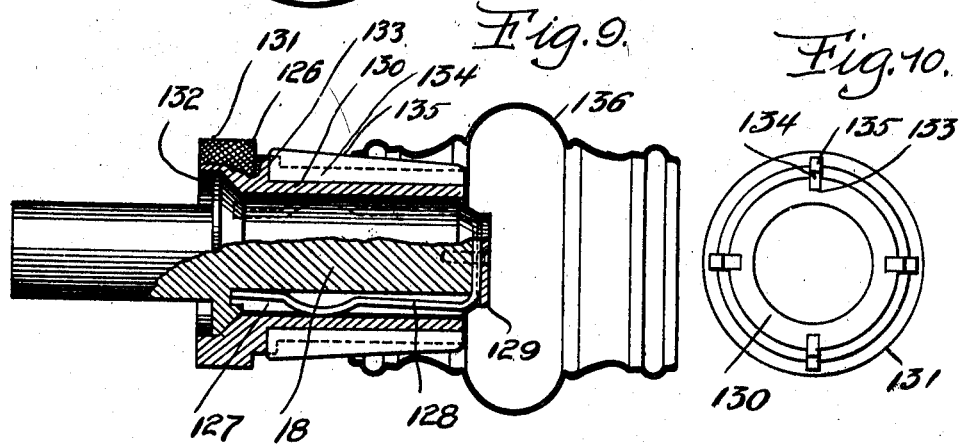
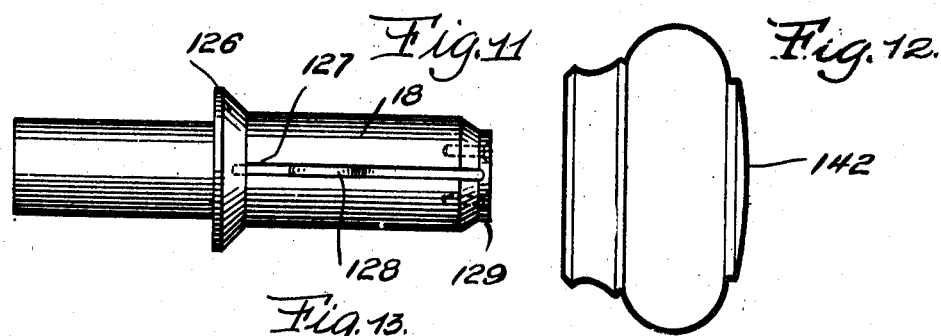
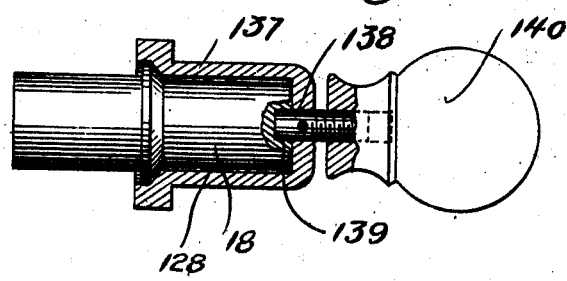
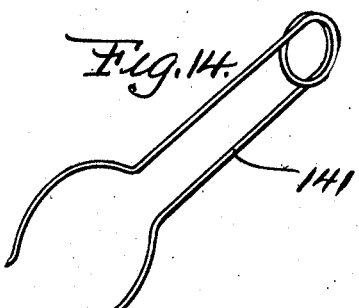

UNITED STATES PATENT OFFICE.

JOE H. ENGLEMAN, OF PITTSBURG, PENNSYLVANIA.

MACHINE FOR MANUFACTURING LACQUERED WARE.

990,645.

Specification of Letters Patent.

Patented Apr. 25, 1911.

Application filed November 29, 1910. Serial No. 594,684.

*To all whom it may concern:*

Be it known that I, JOE H. ENGLEMAN, a citizen of the United States of America, residing at North Side, Pittsburg, in the county of Allegheny and State of Pennsylvania, have invented certain new and useful Improvements in Machines for Manufacturing Lacquered Ware, of which the following is a specification, reference being had therein to the accompanying drawing.

This invention relates to a machine for manufacturing lacquered ware, and more particularly to a machine for automatically, evenly and quickly coating bulbs, globes and other ornamentations or bodies that are especially designed for bedsteads, lamp fixtures, plumbing goods and other structures made of metallic tubing, wrought iron and other metals with lacquer, varnish, bronze powder, paint, enamel or any preserving or finishing substance.

The primary object of the invention is to provide a machine of the above type with positive and reliable means in a manner as will be hereinafter set forth for shifting a lacquer pot whereby a revoluble piece of work will be coated with lacquer which is evenly distributed throughout the surface of the ware, thus insuring a high degree of perfection without necessarily employing skilled labor or artisans.

Another object of the invention is to provide a machine of the above type with simple and effective means for shifting a lacquer pot whereby irregular or curvilinear surfaces can be coated to provide the piece of work with an even and uninterrupted finished surface.

The above objects are attained by a machine that has been primarily designed for coating with lacquer various ornamentations used in connection with metallic bedsteads and tubular structures, the elements of the machine being arranged whereby they can be automatically controlled from start to finish, thereby insuring a production that will be uniform throughout and of that degree of perfection that is above the standard. To this end, I have devised a machine embodying a shiftable lacquer pot support that can be easily adjusted whereby it can be swung at a desired arc to accurately apply lacquer to various sizes of pieces of work in connection with the machine. The lacquer pot support is limited in its movement by certain automatic devices that place the support in operation and control its movement during operation, the exact movements of the support being predetermined by the attendant of the machine.

With this understanding of the broad idea or principle of the invention, reference will be had to the drawings, wherein like numerals of reference designate corresponding parts throughout the several views, and in which:—

Figure 1 is a plan of the machine, Fig. 2 is an end view of the same, Fig. 3 is a vertical sectional view taken on the line III—III of Fig. 1, Fig. 4 is a longitudinal sectional view of the machine, Fig. 5 is a side elevation of the machine, Fig. 6 is a plan of a portion of the machine partly broken away and partly in section, Fig. 7 is a detail view of a clamp adapted to form part of the machine. Fig. 8 is a longitudinal sectional view of a ware holder adapted to form part of the machine, Fig. 9 is a longitudinal sectional view of a modified form of holder, Fig. 10 is an end view of the same, Fig. 11 is a plan of a portion of the holder, Fig. 12 is a vertical sectional view of a piece of ware adapted to be held by the holder, Fig. 13 is a longitudinal sectional view of still another modified form of holder, and Fig. 14 is a perspective view of a wrench or gripping device adapted to be used for handling lacquered ware.

The reference numeral 1 denotes a base plate provided with a central socket 2 having the inner walls thereof screw threaded, as at 3 to receive the lower exteriorly screw threaded end of a tubular pedestal 4.

5 denotes a head having the lower end thereof reduced to provide a shank 6 which is fitted within the upper end of the pedestal 4 to support the head 5 upon said pedestal, said shank being shrunk or otherwise fixed within the upper end of said pedestal. The head 5 is provided with lateral flanges 7, and these flanges support an A-frame 8 having the upper end thereof provided with a longitudinal bearing 9 and journaled in said bearing is a longitudinal revoluble shaft 10. Keyed or otherwise fixed upon the shaft 10, as at 11 is a stepped pulley 12 and loosely mounted upon the shaft 10 and retained thereon by a collar 13 is an idler 14, said idler being located contiguous to the small end of the stepped pulley 12. The opposite end of the shaft 10 has a head 15 provided with a socket 16 for the shank 17 of a conical-shaped ware holder 18, the shank of said ware holder being retained within the socket 16 by a screw plug 19. The conical-shaped holder 18 has the sides thereof flattened, as at 20 and said holder is adapted to protrude into one of the openings of a piece of ware 21 held in engagement with the holder by a manually held rod 22, one end of said rod extending into a recess 23 provided therefor in the holder 18, and the opposite end of the rod having an adjustable handle 24. It is through the medium of the rod 22 that the piece of ware 21 can be frictionally held in engagement with the holder 18. The revoluble shaft 10 can be driven by a motor or other source of power, for instance by a power shaft 24 from which a rotary movement is transmitted to the small end of the pulley 12 by a belt 25. The shaft and its appurtenant parts constitute a lathe or means for imparting a rotary movement to the piece of ware or work to be coated with lacquer.

26 and 27 denote angle bars arranged against the sides of the head 5 and extending outwardly from said head, the bar 26 being secured to the head and one of the flanges thereof by screw bolts 28 or other fastening means, and the bar 27 is secured to the head by screw bolts 29 and 30 or other fastening means, some of the screw bolts 30 retaining a bearing 31 in engagement with the angle bar 27. Journaled in the bearing 31 is the smooth cylindrical end 32 of a feed screw 33, said feed screw having the opposite end thereof revolubly mounted in a bearing 34 suitably secured to the outer end of the angle bar 27. The smooth end of the feed screw 33 is retained in the bearing 31 by a collar 35 at one end of said bearing and a pulley 36 at the opposite end of said bearing. Over the pulley 36 and the large end of the stepped pulley 12 is arranged a belt 37 adapted to transmit a rotary movement from the lathe shaft 10 to the feed screw 33.

38 and 39 denote cross heads mounted upon the angle bars 26 and 27 and secured thereto by screw bolts 40 and 41, the cross head 38 being located adjacent to the head 5 and the cross head 39 upon the outer end of the angle bars 26 and 27. Suspended from the cross heads 38 and 39 and retained in engagement with the lower edge of the angle bars 26 and 27 by hangers 42 is a longitudinal bearing plate 43, said plate having one edge thereof cut away, as at 44 to receive the lower edge of the angle bar 26, and the other angle bar 27 is adapted to extend into a longitudinal groove 45 provided therefor in said bearing plate. The bearing plate 43 is provided with three depending bosses 46, 47 and 48, the bosses 46 and 48 being arranged in longitudinal alinement centrally of the machine and the boss 47 set to one side adjacent to the rear edge of the plate 43. The bosses 46 and 48 are provided with vertical openings 49 and arranged in said openings are vertical stems 50 having the upper ends thereof provided with concentric heads 51 and eccentrically located upon said heads are vertical pins 52. Retained upon said heads by the pins 52 is a longitudinal reversing bar 53, and engaging the longitudinal edges of said bar are anti-friction rollers 54 supported by straps 55, carried by an automatic feed or clutch block 56. The automatic feed or clutch block 56 is movably supported by anti-friction balls 57 upon the longitudinal bearing plate 43, and the outer side of said block is cut away, as at 58 and provided with a threaded groove 59 to receive the feed screw 33. The angle bar 27 is longitudinally slotted, as at 60 to provide clearance for the straps 55, and extending over said bar is a right angular arm 61, secured, as at 62 to the reversing bar 53 adjacent to the outer end thereof, said arm being braced by an angularly disposed arm 63 secured to the end of the reversing bar 53 and to the arm 61 at a point removed from the fixed end thereof. Bolted or otherwise secured, as at 64 to the outer end of the arm 61 is a longitudinal rod 65 provided with an adjustable collar 66, the object of which will presently appear.

67 denotes a collar fixed upon the lower end of the stem 50 of the boss 48, and said collar is provided with a depending pin 68 engaged by the outer end of a flat spring 69, carried by a depending pin 70 fixed in the boss 47 by a set screw 71.

The stem 50 of the boss 46 is of a greater length than the stem 50 of the boss 48, and upon said stem is fixed by a screw 72 or other fastening means a collar 73. To this collar is attached a chain or cable 74 passing over a revoluble circumferentially grooved wheel 75 and having the end thereof attached to said wheel, as at 76. The wheel 75 is revolubly supported in hangers 77, secured, as at 78 to the under side of the bearing plate 43. Pivotally connected to the side of the wheel 75, as at 79 is a pitman 80 having the lower end thereof connected, as at 81 to a treadle 82 pivotally mounted, as at 83 in bearings 84 provided therefor upon the base plate 1 adjacent to the pedestal 4. The elements 73 to 84 inclusive constitute a starting device or means whereby the machine can be easily placed in operation.

85 denotes depending brackets secured to the under side of the bearing plate 43 by the hangers 42, said brackets being located at diametrically opposed sides of the boss 46. Arranged in the lower end of the brackets 85 is an air inlet pipe 86 and an air outlet pipe 87, said pipes supporting a valve body 88 between said brackets. The valve body 88 is provided with a revoluble valve plug 89 having a port 90 adapted to control the passage of air from the pipe 86 to the outlet pipe 87. The outer end of the plug 89 is fixed, as at 91 in the lower end of the stem 50 of the boss 46, whereby said plug will rotate in unison with said stem.

92 denotes a platform carried by the angle bars 26 and 27 and secured thereto by bolts 93 or other fastening means. The platform 92 extends beyond the bar 26 and is provided with a plurality of equally spaced vertical openings 94, the walls of said openings being threaded to receive the lower reduced and exteriorly threaded end 95 of a post 96 having a suitable handle 97 whereby it can be easily rotated. The post 96 retains a pivoted pot support upon the platform 92, said support comprising a disk 98 having secured to the upper side thereof, as at 99 arms 100 and 101, said arms being arranged in parallelism with the arm 100 provided with a plurality of equally spaced openings 102. In connection with these arms a clamp is used for connecting the arms together, also for clamping the base of a lacquer pot between said arms. The clamp comprises a stirrup 103 placed in engagement with the arm 101, said stirrup having one arm thereof apertured and the other arm slotted and bent to engage the arm 101, said arms receiving a bolt 104. One end of the bolt is provided with a hook 105 to engage in one of the apertures 102 of the arm 100, and the opposite end thereof is threaded for a nut 106, which when screwed upon the bolt will have a tendency to draw the arms 100 and 101 toward each other. The arm 101 is provided with a longitudinal guide rod 107, said guide rod being arranged at the outer side of the arm 101 to provide a slot 108 adapted to receive the upper end of a pin 109, carried by the automatic feed or clutch block 56. Arranged between the arms 100 and 101 is the lower circumferentially grooved end 110 of a base plate 111 upon which is mounted a lacquer pot 112. The lacquer pot 112 is of a conventional form having a lacquer outlet pipe 113 and a blow pipe 114, said blow pipe being connected by a flexible connection or hose 115 to the outlet pipe 87 of the valve body 88.

116 denotes a chain or cable passing over a revoluble grooved sheave 118 arranged in a recess 119 provided therefor in the outer end of the head 5. The chain or cable 116 is connected to the upper convolution 120 of a coiled retractile spring 121, said retractile spring having the lower convolution thereof connected to a screw eye 122 mounted in the pedestal 4.

123 denotes a stop block adjustably held by the bolt 41 and a nut 41ª against the under side of the angle bar 27 adjacent to the cross head 38, the bolt 41 extending through a slot 124 provided therefor in the block 123. The stop block 123 is adjustably held by the nut 41ª and is adapted to limit the horizontal movement of the pivoted pot support in one direction, while the adjustable collar 66 upon the rod 65 limits movement of the support in the opposite direction.

125 denotes anti-friction balls that can be used in connection with the disk 98 of the platform 92 for reducing the friction of these two elements to a minimum.

In Figs. 9 to 11 inclusive there is illustrated a modified form of holder wherein the head 18 is cylindrical and provided with a beveled collar 126. The head 18 is provided with longitudinal diametrically opposed grooves 127 and arranged in said grooves are the ends of a U-shaped spring 128, said spring being retained in engagement with the head by a cap 129 detachably mounted upon the end of the head. The resiliency of the ends of the spring causes the spring to frictionally grip a sleeve 130 detachably mounted upon the head, said sleeve having the inner end thereof enlarged to provide a knurled collar 131 having an annular recess 132 to receive the collar 126. The sleeve 130 has equally spaced longitudinal grooves 133 and fitted in said grooves are ribs or keys 134 having the outer longitudinal edges thereof tapered, as at 135. A piece of ware 136 can be fitted upon the ribs 134 and frictionally held while the holder rotates.

Another modification of the holder is illustrated in Fig. 13 of the drawing, wherein a cap 137 is mounted upon the head 18 and frictionally held by the ends of the spring 128. The cap 137 has the outer end thereof provided with a stationary studbolt 138, and the end of the head 18 is provided with a recess 139 to receive the inner end of the bolt 138. A piece of ware, as a knob 140 can be readily screwed upon the bolt 138, during a rotation of the head 18.

In Fig. 14 a wrench or gripping device made of a single piece of wire 141 can be advantageously used for gripping and handling the pieces of ware 21, 136, 140 and a piece of ware designated 142 in Fig. 12 of the drawings, all these pieces of ware representing ornamentations of various contours used in the construction of bedsteads, etc.

The various holders just described constitute means whereby ware of various shapes can be lacquered by my improved machine.

Operation:—Assuming that the shaft 10 and feed screw 33 are revolved, the attendant of the machine through the medium of the rod 22 and the handle 24 can easily place the piece of ware or work 21 in engagement with the holder 18, whereby the piece of ware will be revolved as though it were in a lathe. To coat the piece of revolving ware with lacquer, it is only necessary that the attendant lower the treadle 82, and through the medium of the wheel 75 and the cable 74, the collar 73 will be partially rotated to partially revolve the stem 50 of the boss 46 and this movement of the stem accomplishes two results. First, the valve plug 89 is rotated to allow air to pass through the flexible connection 115 to the blow pipe 114 of the lacquer pot 112, whereby the contents of the lacquer pot will be projected against the periphery of the piece of work held by the holder 18. Second, the partial movement of the stem 50 of the boss 46 causes the heads 51 and the eccentric pins 52 thereof to shift the reversing bar 53 whereby the automatic feed or clutch block 56 will be immediately moved into engagement with the feed screw 33. As this feed screw is revolved, the clutch block through the medium of the pin 109 and guide rod 107 will immediately commence to swing the outer end of the pivoted pot support from the block 123 toward the adjustable collar 66. As the pot support is pivoted upon the platform 92 and the lacquer pot 112 held by said support, said lacquer pot will be moved in an arc relatively to the piece of work and consequently the entire surface of the piece of work will be evenly coated with lacquer from the pot 112. Immediately that an apertured lug 126 carried by the block 56 and sliding upon the rod 65, engages the collar 66, the arm 61 will be shifted to restore the reversing bar 53 to its normal position, move the block 56 out of engagement with the screw 33 and close the valve 88. The cable 116 and the retractile spring 121 will then restore the pivoted pot support to its normal position ready to be swung again whereby the lacquer pot carried thereby can coat another piece of ware placed in the lathe. The flat spring 69 is employed to assist in shifting the reversing bar 53 to move the automatic feed block 56 out and into engagement with the feed screw 33.

From the foregoing it will be observed that the pivoted end of the pot support can be adjusted upon the platform 92 whereby it will describe various arcs when swung through the medium of the feed block 56 and the screw 33, and further adjustment is obtained, for instance for large or small pieces of ware, by clamping the pot base 111 between the arms 100 and 101 of the pivoted pot support.

It will be noted that the machine embodies means for automatically controlling the supply of air to a lacquer pot, means adapted to swing a lacquer pot in a horizontal plane, means whereby the arc at which the pot is swung can be adjusted, and means for automatically controlling the movement of the pot.

What I claim is:—

1. A machine of the type described embodying means adapted to revolubly support a piece of work, an adjustable lacquer pot support movable with relation to said means, and means adapted to swing said support in an arc relative to the work supported by said means.

2. A machine of the type described embodying a lathe adapted to revolubly support a piece of work, a pivoted support adapted to swing in a horizontal plane relatively to said piece of work, and a lacquer pot adjustably connected to said support.

3. A machine of the type described embodying a lathe adapted to revolve a piece of work, a pivoted and adjustable lacquer pot support, means including a feed screw adapted to swing said support relatively to said lathe, and means automatically actuated by said support and adapted to control the operation of the pot carried by said support.

4. A machine of the type described embodying a lathe adapted to revolve a piece of work, a pivoted and adjustable lacquer pot support, means including a feed screw adapted to swing said support relatively to said lathe, means automatically actuated by said support and adapted to control the operation of the pot carried by said support, said means including a reversing bar, and a valve adapted to be actuated through the medium of said bar to control the supply of air to the pot of said support.

5. A machine of the type described embodying a lathe adapted to revolve a piece of ware, a platform, a lacquer pot movably and adjustably supported from said platform, means including a feed screw adapted to swing said pot in an arc relatively to said piece of ware, and means actuated by the first mentioned means and adapted to control the supply of air to said lacquer pot.

6. A machine of the type described embodying a lathe adapted to revolve a piece of ware, a platform adjacent to said lathe, a pivoted pot support adjustably supported by said platform, a lacquer pot adjustably mounted upon said support, means including a feed screw and adapted to swing said support in an arc, and means including a reversing bar adapted to be actuated by said support to control the operation of said pot.

7. A machine of the type described embodying a lathe adapted to revolve a piece of ware, a platform adjacent to said lathe, a pivoted pot support adjustably supported by said platform, a lacquer pot adjustably mounted upon said support, means including a feed screw and adapted to swing said support in an arc, means including a reversing bar adapted to be actuated by said support to control the operation of said pot, and means including a retractile spring adapted to restore said support to its normal position.

8. The combination with means for revolubly supporting a piece of ware, of a platform, a pivoted support adjustably mounted upon said platform, a lacquer pot adjustably mounted upon said support, and means including a feed screw and a clutch block adapted to swing said support in an arc relatively to said piece of ware.

9. The combination with means for revolubly supporting a piece of ware, of a platform, a pivoted support adjustably mounted upon said platform, a lacquer pot adjustably mounted upon said support, means including a feed screw and a clutch block adapted to swing said support in an arc relatively to said piece of ware, and means including a retractile spring adapted to restore said support to its normal position.

10. The combination with means for revolubly supporting a piece of ware, of a platform, a pivoted support adjustably mounted upon said platform, a lacquer pot adjustably mounted upon said support, means including a feed screw and a clutch block adapted to swing said support in an arc relatively to said piece of ware, means including a retractile spring adapted to restore said support to its normal position, and means including a reversing bar, and a valve adapted to be actuated thereby for controlling the operation of said pot.

11. A machine of the type described embodying a pedestal, a lathe supported thereby and adapted to revolubly support a piece of work, bars supported from said pedestal, a platform supported by said bars, a lacquer pot support pivotally mounted upon said platform, and means supported by another of said bars and adapted to swing said support in an arc relatively to said lathe.

12. A machine of the type described embodying a pedestal, a lathe supported thereby and adapted to revolubly support a piece of work, bars supported from said pedestal, a platform supported by said bars, a lacquer pot support pivotally mounted upon said platform, means supported by another of said bars and adapted to swing said support in an arc relatively to said lathe, and means in connection with said pedestal and adapted to restore said support to its normal position.

13. A machine of the type described embodying a pedestal, a lathe carried by the upper end thereof and adapted to revolubly support a piece of work, a platform supported from said pedestal, a support pivotally and adjustably mounted upon said platform, a lacquer pot adjustably mounted upon said support, and means including a feed screw and a clutch block adapted to automatically swing said support in an arc relatively to the piece of work.

14. A machine of the type described embodying a pedestal, a lathe carried by the upper end thereof and adapted to revolubly support a piece of work, a platform supported from said pedestal, a support pivotally and adjustably mounted upon said platform, a lacquer pot adjustably mounted upon said support, means including a feed screw and a clutch block adapted to automatically swing said support in an arc relatively to the piece of work, and means including a reversing bar, and a valve adapted to automatically control the operation of said lacquer pot.

15. A machine of the type described embodying a pedestal, a lathe carried by the upper end thereof and adapted to revolubly support a piece of work, a platform supported from said pedestal, a support pivotally and adjustably mounted upon said platform, a lacquer pot adjustably mounted upon said support, means including a feed screw and a clutch block adapted to automatically swing said support in an arc relatively to the piece of work, means including a reversing bar, a valve adapted to automatically control the operation of said lacquer pot, and means including a retractile spring in connection with said pedestal and adapted to restore said support to its normal position.

16. The combination with means adapted to revolubly support a piece of work, of a platform, a lacquer pot support movably carried by said platform, a feed screw adapted to impart movement to said support, a clutch block adapted to engage said feed screw and move said support, a reversing bar adapted to be automatically actuated to move said clutch block into and out of engagement with said feed screw, and means in connection with said block and said support and adapted to swing said support at an arc relatively to said piece of work.

17. The combination with means adapted to revolubly support a piece of work, of a platform, a lacquer pot support movably carried by said platform, a feed screw adapted to impart movement to said support, a clutch block adapted to engage said feed screw and move said support, a reversing bar adapted to be automatically actuated to move said clutch block into and out of engagement with said feed screw, means in connection with said block and said support and adapted to swing said support at an arc relatively to said piece of work, and means including a retractile spring adapted to restore said support to its normal position.

18. The combination with means adapted to revolubly support a piece of work, of a platform, a support pivotally and adjustably supported by said platform, a lacquer pot adjustably mounted upon said support, a feed screw actuated by the first mentioned means and adapted to impart a movement to said support, a clutch block adapted to engage said feed screw, a reversing bar adapted to be actuated to move said clutch block into and out of engagement with said feed screw, means including a valve actuated by a movement of said reversing bar and adapted to control the ejection of material from said pot, and means in connection with said block and said support and adapted to swing said support at an arc relatively to said piece of work.

19. The combination with means adapted to revolubly support a piece of work, of a platform, a support pivotally and adjustably supported by said platform, a lacquer pot adjustably mounted upon said support, a feed screw actuated by the first mentioned means and adapted to impart a movement to said support, a clutch block adapted to engage said feed screw, a reversing bar adapted to be actuated to move said clutch block into and out of engagement with said feed screw, means including a valve actuated by a movement of said reversing bar and adapted to control the operation of said pot, means in connection with said block and said support and adapted to swing said support at an arc relatively to said piece of work, and means adapted to restore said support to its normal position.

In testimony whereof I affix my signature in the presence of two witnesses.

JOE H. ENGLEMAN.

Witnesses:
 KARL H. BUTLER,
 MAX H. SROLOVITZ.